United States Patent [19]

Mason, Jr.

[11] Patent Number: 4,779,378

[45] Date of Patent: Oct. 25, 1988

[54] INTEGRABLE, MODULAR STACKABLE MULTI-PLANT HOLDER

[76] Inventor: Stanley I. Mason, Jr., 61 River Rd., Weston, Conn. 06880

[21] Appl. No.: 579,351

[22] Filed: Feb. 13, 1984

[51] Int. Cl.[4] .................................. A01G 9/02
[52] U.S. Cl. ........................................ 47/83
[58] Field of Search .............. 220/23.6; 206/501, 504; D11/143, 152, 153, 155; 47/82, 83, 66, 321

[56] References Cited

U.S. PATENT DOCUMENTS

| | | | |
|---|---|---|---|
| D. 193,485 | 8/1962 | White | D11/152 |
| D. 262,274 | 12/1981 | Lahr | 47/82 |
| 3,686,791 | 8/1972 | Mills | 47/83 |
| 4,123,873 | 11/1978 | Canova | 47/83 |
| 4,216,617 | 8/1980 | Schmidt | 47/82 |
| 4,263,744 | 4/1981 | Stoller | 47/1.1 |
| 4,369,598 | 1/1983 | Beckwith | 47/66 |

FOREIGN PATENT DOCUMENTS 231444  6/1944  Switzerland ...................... 47/83

Primary Examiner—Robert A. Hafer
Assistant Examiner—B. Lewis
Attorney, Agent, or Firm—Haynes N. Johnson

[57] ABSTRACT

A modular and stackable planter is provided which forms a botanically integrated unit for growing plants. The sections are generally cylindrical, but each section of the planter includes a plurality of radially-extending wall surfaces at its upper end and a plurality of corresponding radially-recessed surfaces at its lower end. The surfaces at the upper and lower ends are peripherally offset from one another to, together, complementarily define plant-receiving receptacles. The sections are dimensioned so that the base of one engages the top of the one below it; and provision is made for vertical water transmission throughout the stack of units and for root aeration.

7 Claims, 3 Drawing Sheets

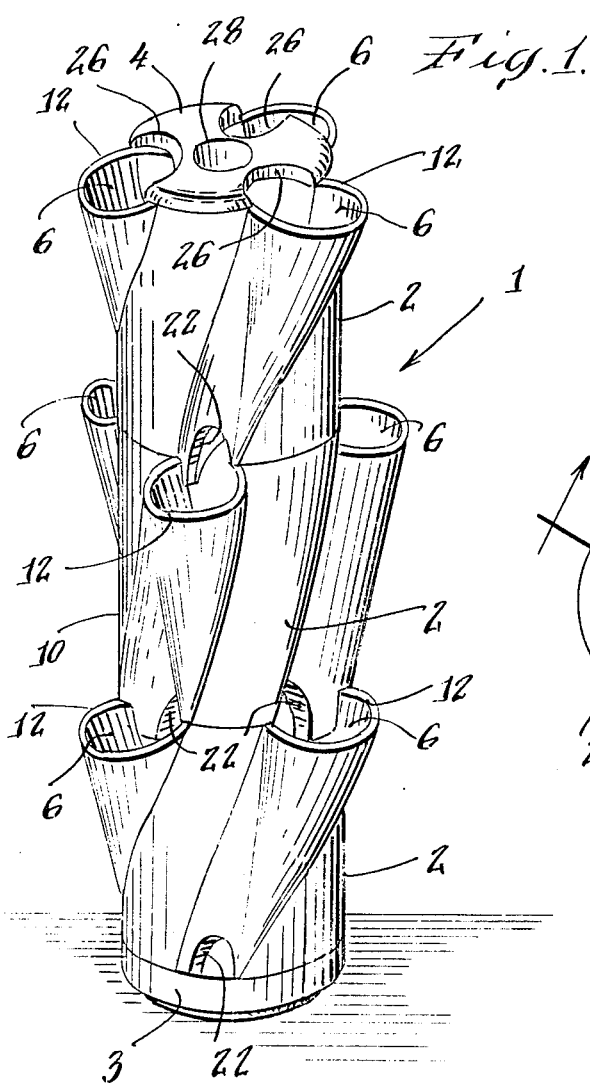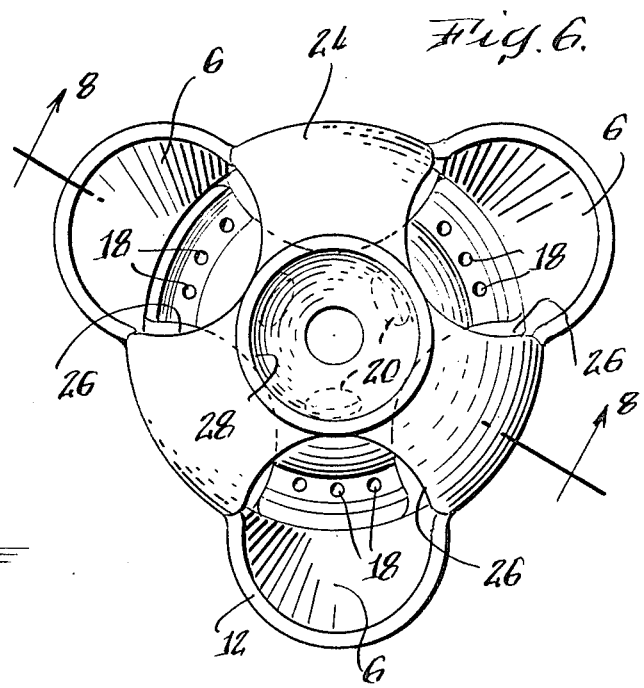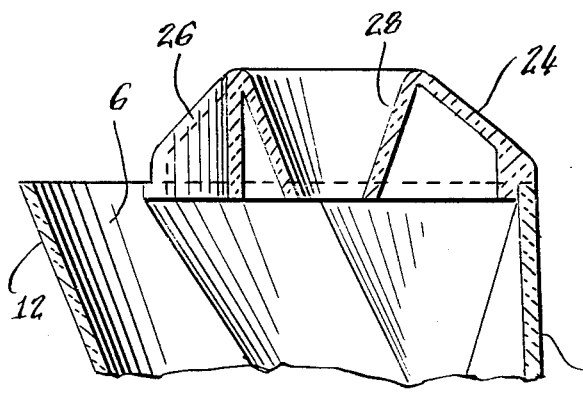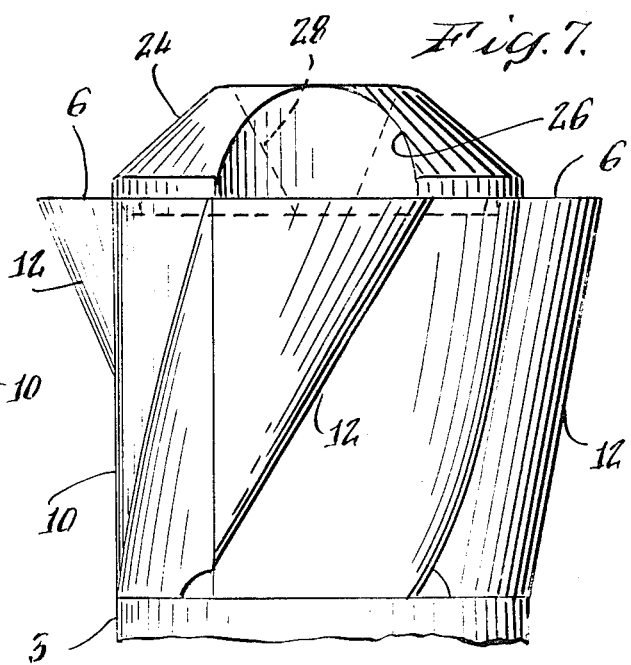

INTEGRABLE, MODULAR STACKABLE MULTI-PLANT HOLDER

BACKGROUND OF THE INVENTION

Planters capable of holding a multiplicity of plants have long existed, as have various flower pots which are in some manner stackable. It has not, however, always been possible to have a modular unit which is stackable where the stacking itself serves to define plant-receiving receptacles formed through complementary cooperation between the units. Nor is it believed that stacked planter units have previously been botanically integrated.

SUMMARY OF THE INVENTION

This invention relates to a modular plant holder having a base portion and generally cylindrical upstanding sides. The sides have radially-extending surfaces uniformly spaced about the top periphery and a similar number of uniformly spaced radially-recessed surfaces along the bottom periphery. Preferably, the upper radially-extending portions are peripherally offset relative to the lower radially-recessed portions, that is, no upper radially-extending surface is directly above a radially-recessed lower portion, but, rather, the two are rotated a certain number of degrees with respect to one another. When the units are stacked, the respective upper and lower portions are aligned to fit together in a complementary manner and so form plant-receiving receptacles. Preferably, the rotation is 120 degrees, thus providing for three plant-receiving receptacles at each junction.

The base of each unit has a diameter smaller than the inner diameter of the top of the unit, so that the base of one unit may fit within, and interengage with the top of a corresponding unit. Preferably, these units are in some manner keyed so that when fitted together the recessed and extending surfaces are aligned to form the plant-receiving receptacles.

The base of each unit includes openings so spaced as to permit soil contact between soil of corresponding units for the conduction of moisture and air; and the base is also designed to permit transmission of gases between the soil and the outside atmosphere.

A cover and a supporting base are provided to fit the top and bottom of a stack of units, respectively. The cover includes openings for watering the plants.

DESCRIPTION OF THE DRAWINGS

FIG. 1 is a perspective view of three plant-holding units stacked to form a three-level planter. It also shows the supporting base and a cover.

FIGS. 6 and 8 show top and sectional views, respectively, of a modified cover plate.

FIG. 7 shows another modified cover plate.

DETAILED DESCRIPTION OF THE INVENTION

Figure 2:
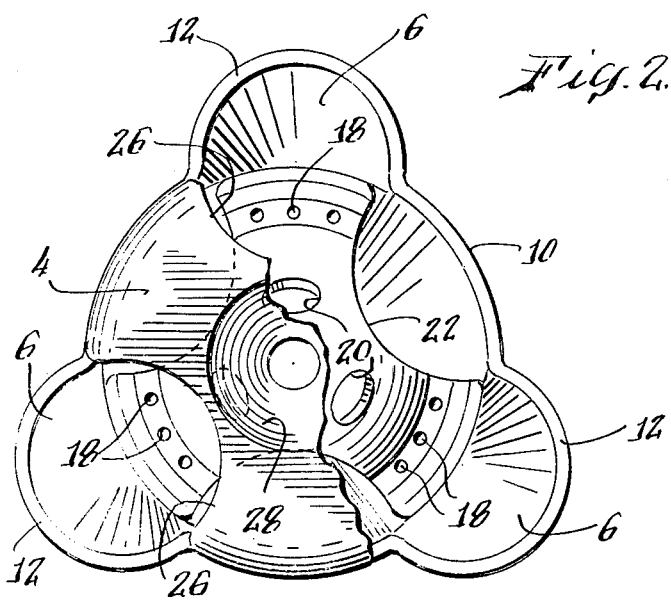
FIG. 2 is a bottom plan view of one such unit.

The planter 1 of this invention is made up of one or more modular sections 2 which are stackable and fit on a supporting base 3, and have a top cover 4. The design of section 2 is such that the configuration of the bottom of one section complements the configuration of the top of another section, when the two are fitted together, to form a series of plant-receiving receptacles 6. They may be keyed for best alignment.

Figure 3:
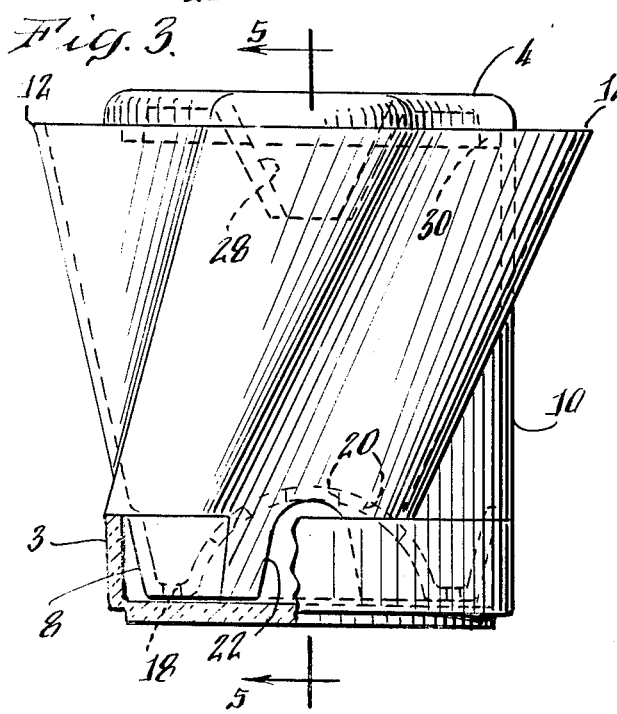
FIG. 3 is a side view of a single unit used as a planter and includes a supporting base and cover. It is partially broken away to show interior structure.

FIG. 1 shows a stack of three modular sections 2 on a supporting base 3, with a cover 4. The height of the stack and the number of plant-receiving receptacles can be varied, as for example with the use of three modular sections 2 as shown in FIG. 1 or a single section 2 as shown in FIG. 3. Regardless of the height, each assembled unit has one base 3 and one cover 4.

Each modular section might be described as having a generally cylindrical configuration, which would be a base portion 8 and generally cylindrical wall 10 arising above the base. Actually, the diameter of the cylindrical wall 10 varies, since at the top it has areas of greater than average diameter (radially-extending portions 12), and at the bottom it has areas of lesser diameter (radially-recessed portions 14). Each modular section 2 should have the same number of radially-extending portions 12 as radially-recessed portions 14, and they should be uniformly spaced around the periphery of the section. In my preferred form there are three radially-extending portions along the top of each section 2 and three radially-recessed portions 14 along the bottom of each modular section. These would be spaced 120 degrees apart.

Preferably, the radially-recessed portions 14 are not directly below the radially-extending portions 12, but, rather, are offset peripherally from them. I believe it best to have this offset such that the extending portions are midway along the periphery relative to the recessed portions. For example, with three of each, the extending portions would be offset 60 degrees peripherally relative to the recessed portions. A nice aesthetic appearance can be created in this way by having the outer configuration flow from top to bottom in a somewhat diagonal fashion.

Figure 5:
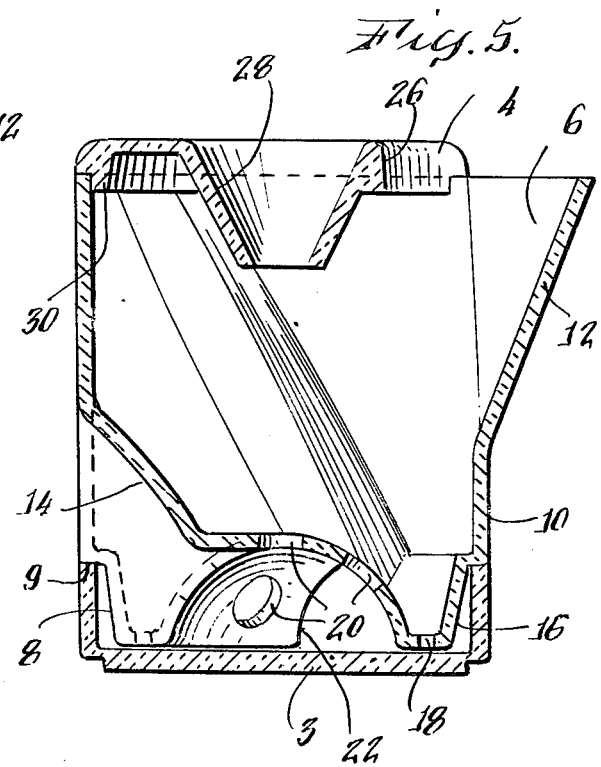
FIG. 5 is a sectional slice through the unit made along line 5—5 of FIG. 3 to show the internal construction of the unit.
Figure 4:
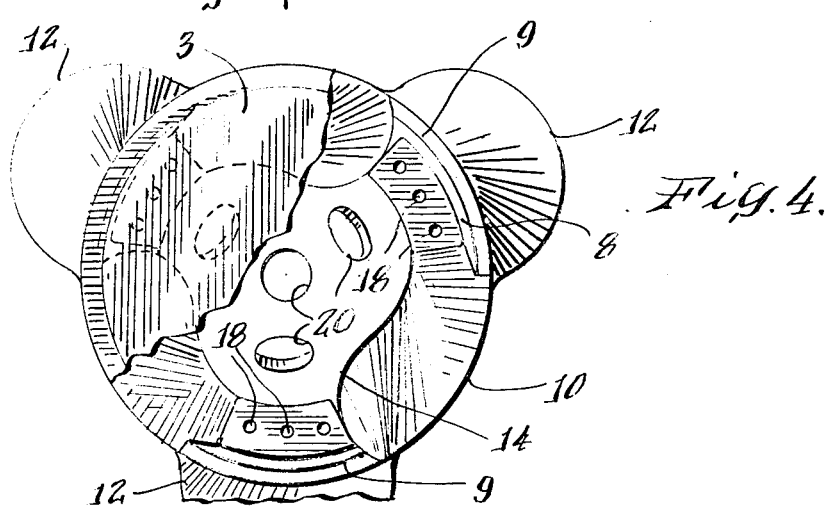
FIG. 4 is a bottom plan view of the unit, with the supporting base partially broken away to show the bottom view of one section.
Figure 9:
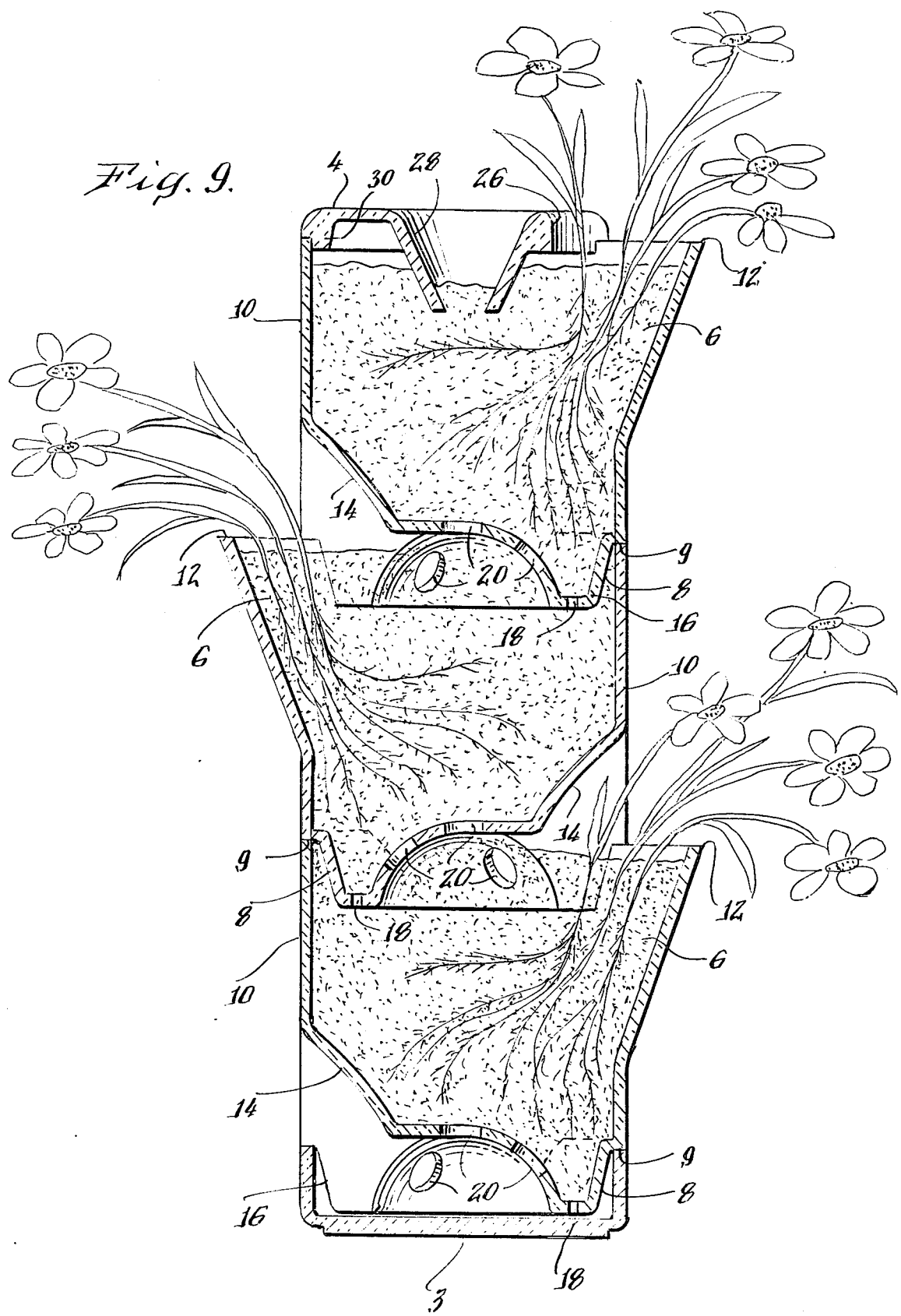
FIG. 9 is a sectional slice cut through a three-level unit showing plants and soil in the unit and plants growing in each of the plant-receiving receptacles.

Base portion 8 is slightly recessed from the average diameter of walls 10 of section 2 in those portions that do not have radially-recessed portions 14. This recess provides a step 9 between base portion 8 and wall 10. Step 9 is dimensioned to fit within the upper portion of a modular section which has been fitted below it, or if the step 9 is on the lowest section of the unit, it then fits upon the top edge of supporting base 3 (FIG. 5).

As can be seen, those portions of supporting base 3 that do not have the radially-recessed areas 14 define downwardly extending base flanges 16. Base flanges 16, then, contain steps 9 and serve to support section 2 on the modular section 2 below it or, if it is the bottom section, on the supporting base 3.

In addition to acting as supports, base flanges 16 serve to transmit water from an upper section to a section below it and also to aerate the soil for better growth. Water transmission is through holes 18 on the bottom of base flanges 16. Soil aeration occurs through larger soil aeration holes 20 on the upper inside area of base flanges 16 and toward the center of the base portion 8. The space between base flanges 16 defines arches 22 in the radially-recessed portions 14 to permit air and carbon dioxide transmission between the inside and outside of the unit. Consequently, when the upper modular section is watered, the water can flow downwardly through the soil and through water transmission holes to the modular section 2 below the watered section and can continue downwardly through all of the modular sections in the stack, or upwards from the saucer below to soil above, by capillary action. Some water may also flow through the larger soil aeration holes 20. In addition, aeration of the soil is improved by air entering the soil from the bottom of each section through arches 22 and soil aeration holes 20. These holes may also serve to release plant generated gases, such as ethylene, from the soil to the atmosphere.

The supporting base 3 is essentially a saucer with upstanding sides. The sides are so dimensioned that the base portion 8 fits within the saucer, preferably with base flanges 16 resting on the bottom (and with the step 9 resting on the top of the upstanding portions of the base).

The top or cover 4, which rests upon the top of the uppermost modular section 2 in the stack, can be of the type illustrated at the top of the stack in FIG. 1. There it is shown as having a body 24 with recesses 26 along its periphery and an opening in the center 28 which is funnel-shaped to receive water for watering the plants. Recesses 26 correspond in size and placement so that they, together with radially-extending portions 12, serve to define the upper plant-receiving receptacles 6. As shown in FIGS. 3 and 5, cover 4 may also include downwardly extending flanges 30 between recesses 26 to fit and hold cover 4 within the top of modular section 2.

A modified cover plate is shown in FIGS. 6 and 8. There the body 24 is shown as rising toward the center (rather than being flat as in FIG. 1) and the funnel 28 is elevated accordingly. The modification of FIG. 7 shows a raised funnel section with a generally flat top surface.

In use, one takes one or more of the modular sections 2 in conjunction with one supporting base 3 and one cover 4 and stacks them. If only one section 2 is used, base 3 is immediately below it and cover 4 immediately above. If more than one section is used, as is probable, the sections 2 are stacked one on top of another between the base 3 and the cover 4. Each section 2 should be filled with soil prior to stacking and, when stacked, the radially-extending portion 12 on the lower section should fit opposite the radially-recessed portions 14 on the upper section in order to define the plant-receiving receptacles 6. Similarly, the cover recesses 26 should be opposite the radially-extending portions 12 of the upper modular section 2, to define the receptacles 6. Plants can then be placed in receptacle 6 and allowed to grow. The assembled unit is watered from time to time through funnel 28 in the cover and the water will work its way down throughout the entire unit.

The cross-section of the section 2 need not be circular, but can have any closed configuration. There can be different numbers of radially-extending portions 12 and radially-recessed portions 14, the choice being a matter of design. There should, however, be the same number of each and they should either be uniformly spaced around the periphery of modular section 2 so that they complement one another when the sections are stacked, or should define a dimensionally similar pattern so that the sections may be stacked and portions 12 and 14 will fit in a complementary fashion. Recesses 6, in the cover, should also be of the same number and spaced accordingly.

If the unit is of sufficient width, sections may be stacked to form a high column.

The resulting planter is efficient for plants in that it cannot be over-watered and there is aeration to prevent root rot (gas exchange can occur at every level and may be emphasized by a "chimney effect").

The planter may be made of ceramic, plastic, or other materials and used for flowers, strawberries, cactus, ivy, herbs, or other plants.

What is claimed is:

1. A modular plant holder unit which is stackable to receive a multiplicity of plants, including:
    an integral base portion and an upstanding wall of closed configuration, such as a circular configuration, said base portion having diameter less than the mean diameter of said wall and being dimensioned to engagingly fit within the top of said walls of a corresponding unit,
    said wall including a plurality of radially-extending portions at the top thereof and a similar number of radially-extending and radially-recessed portions in a given unit being spaced uniformly along the periphery of said wall and being peripherally offset with respect to one another and so dimensioned that the radially-extending portions of one said unit complement the radially-recessed portions of another said unit engagingly fitted above it to form a plurality of plant receiving receptables,
    said base portion closing the bottom of said unit and being shaped to form a plurality of downwardly-extending base flanges about its periphery, said flanges including water transmission openings in the bottom thereof,
    whereby two or more of said plant holder units may be stacked to form an integral and decorative planter.

2. A modular plant holder as set forth in claim 1 in which said flanges define air-transmission arches and said base portion includes air transmission holes in the center area of said base portion.

3. A modular plant holder as set forth in claim 1 in which said flanges include steps for interengagement with a similar holder therebelow.

4. A planter including a plurality of stackable plant-holding sections, each one capable of being a plant holder by itself, and a supporting base,
    each of said plant holding sections being of generally cylindrical configuration and including a substantially closed base portion and an upstanding wall, said base portion being dimensioned to fit within the top of said wall of another said section,
    said wall including a plurality of radially-extending portions at the top thereof and a similar number of radially-recessed portions at the bottom thereof, said radially-extending and radially-recessed portions in a given unit being spaced uniformly along the periphery of said wall and being peripherally offset with respect to one another and so dimensioned that the radially-extending portions of one said unit complement the radially-recessed portions of another said unit engagingly fitted above it to form a plurality of plant receiving receptables,
    said base portion defining a plurality of downwardly extending flanges about its periphery and said flanges defining air-transmission arches for air transmission through openings in the center area of said base portion.

said supporting base being dimensioned to receive said base portion of one said section, and said sections being stacked and mounted upon said supporting base to form a planter having a plurality of plant-receiving receptacles.

5. A planter as set forth in claim 4 including a cover shaped and dimensioned to fit on the uppermost section and define further plant-receiving receptacles.

6. A planter as set forth in claim 5 in which said cover includes a funnel for watering plants held in said sections.

7. A planter as set forth in claim 4 in which said flanges include water-transmission openings and said base portion includes water and air-transmission holes in the central portion thereof.

* * * * *